(12) United States Patent
Grayson et al.

(10) Patent No.: US 11,409,459 B2
(45) Date of Patent: Aug. 9, 2022

(54) DATA PARKING FOR SSDS WITH ZONES

(71) Applicant: Western Digital Technologies, Inc., San Jose, CA (US)

(72) Inventors: Peter Grayson, Grand Rapids, MI (US); Daniel L. Helmick, Broomfield, CO (US); Liam Parker, Edinburgh (GB); Sergey Anatolievich Gorobets, Edinburgh (GB)

(73) Assignee: Western Digital Technologies, Inc., San Jose, CA (US)

( * ) Notice: Subject to any disclaimer, the term of this patent is extended or adjusted under 35 U.S.C. 154(b) by 178 days.

(21) Appl. No.: 16/858,345

(22) Filed: Apr. 24, 2020

(65) Prior Publication Data
US 2021/0334031 A1    Oct. 28, 2021

(51) Int. Cl.
*G06F 3/06* (2006.01)
*G06F 9/30* (2018.01)
*G06F 11/10* (2006.01)

(52) U.S. Cl.
CPC ............ *G06F 3/0652* (2013.01); *G06F 3/064* (2013.01); *G06F 3/0614* (2013.01); *G06F 3/0679* (2013.01); *G06F 9/30029* (2013.01); *G06F 11/108* (2013.01)

(58) Field of Classification Search
None
See application file for complete search history.

(56) References Cited

U.S. PATENT DOCUMENTS

| 9,239,781 | B2  | 1/2016  | Jones et al. |
| 9,984,090 | B1* | 5/2018  | Shang ..................... G06F 16/13 |
| 2021/0333996 | A1* | 10/2021 | Gorobets .............. G06F 3/0652 |

FOREIGN PATENT DOCUMENTS

| WO | 2011019794 A2 | 2/2011 |
| WO | 2018037509 A1 | 3/2018 |

OTHER PUBLICATIONS

International Search Report and the Written Opinion for International Application No. PCT/US2020/064907 dated Apr. 18, 2021, 11 pages.

(Continued)

*Primary Examiner* — Charles Rones
*Assistant Examiner* — Ryan Dare
(74) *Attorney, Agent, or Firm* — Patterson + Sheridan, LLP; Steven H. VerSteeg

(57) ABSTRACT

The present disclosure generally relates to methods of operating storage devices. The storage device comprises a controller comprising first random access memory (RAM1), second random access memory (RAM2), and a storage unit divided into a plurality of zones. A first command to write data to a first zone is received, first parity data for the first command is generated in the RAM1, and the data of the first command is written to the first zone. When a second command to write data to a second zone is received, the generated first parity data is copied from the RAM1 to a parking section in the storage unit, and second parity data associated with the second zone is copied from the parking section to the RAM1. The second parity data is then updated in the RAM1 with the data of the second command and copied to the parking section.

20 Claims, 9 Drawing Sheets

(56) References Cited

OTHER PUBLICATIONS

Lim et al. "Parity-Stream Separation and SLC/MLC Convertible Programming for Lifespan and Performance Improvement of SSD RAIDs" presented at HotStorage 2017 Santa Clara. Retrieved from the Internet on May 27, 2021, (Year: 2017) Retrieved from <URL: https://www.usenix.org/system/files/conference/hotstorage17/hotstorage17-paper-im.pdf> (Year: 2017).

* cited by examiner

| XOR STREAM / ZONE ID | SLC PARKING LOCATION | ERASE BLOCK |
|---|---|---|
| X0 502a | S1 504a | EB1 506a |
| X1 502b | ~~S2 504b~~ | EB1 506a |
| X2 502c | ~~S3 504c~~ | EB1 506a |
| X2 502d | ~~S4 504d~~ | EB1 506a |
| X2 502e | ~~S5 504e~~ | EB1 506a |
| X2 502f | ~~S6 504f~~ | EB1 506a |
| X3 502g | ~~S7 504g~~ | EB1 506a |
| ••• | ••• | ••• |
| X3 502h | S17 504h | EB2 506b |
| X2 502i | S18 504i | EB2 506b |
| X1 502j | S19 504j | EB2 506b |
| 502k | S20 504k | EB2 506b |
| ••• | ••• | ••• |
| Xn 502n | Sm 504m | EBp 506p |

FIG. 5

DATA PARKING FOR SSDS WITH ZONES

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the erase blocks is associated with a logical block address so that the SSD and/or the host device know the location of where the data is stored. One or more erase blocks may be grouped together by their respective logical block addresses to form a plurality of zones.

Typically, one die in each zone is dedicated to storing parity data, such as XOR data, for the zone. As a command is received by the storage device to write data to a particular zone, the data associated with the command is written to the memory device, and parity data is simultaneously generated for the data in order to protect the data. The parity data is then stored in random access memory (RAM), such as SRAM or DRAM, within the storage device. However, the storage device generally comprises a very limited amount of RAM, as RAM is expensive from cost and total system design perspectives. Since parity data is generated for each write command received, the parity data takes up a lot of the valuable RAM space, which may reduce the amount of RAM space available for other data, or may require a greater amount of RAM to be included in the storage device. Since RAM is volatile memory, data is lost when the device loses power. Thus, data storage reliability may be hindered and valuable information may be lost.

Therefore, what is needed is a new method of generating and storing parity data in a storage device.

SUMMARY OF THE DISCLOSURE

The present disclosure generally relates to methods of operating storage devices. The storage device comprises a controller comprising first random access memory (RAM1), second random access memory (RAM2), and a storage unit divided into a plurality of zones. A first command to write data to a first zone is received, first parity data for the first command is generated in the RAM1, and the data of the first command is written to the first zone. When a second command to write data to a second zone is received, the generated first parity data is copied from the RAM1 to a parking section in the storage unit, and second parity data associated with the second zone is copied from the parking section to the RAM1. The second parity data is then updated in the RAM1 with the data of the second command and copied to the parking section.

In one embodiment, a storage device comprises a non-volatile storage unit. The capacity of the non-volatile storage unit is divided into a plurality of zones. The non-volatile storage unit comprises a plurality of dies, and each of the plurality of dies comprises a plurality of erase blocks. The storage device further comprises a first volatile memory unit and a controller coupled to the non-volatile storage unit and the first volatile memory unit. The controller is configured to receive a first write command to write data to a first zone of the plurality of zones and copy the first XOR or parity data associated with the first zone from a first data parking section in the non-volatile storage unit to the first volatile memory unit. The controller is further configured to update the first XOR or parity data associated with the first zone with new XOR or parity data associated with the first write command in the first volatile memory unit and copy the updated first XOR or parity data associated with the first zone from the first volatile memory unit to the first data parking section in the non-volatile storage unit.

In another embodiment, a storage device comprises a non-volatile storage unit. The capacity of the non-volatile storage unit is divided into a plurality of zones. The non-volatile storage unit comprises a plurality of dies, and each of the plurality of dies comprising a plurality of erase blocks. The non-volatile storage unit comprises one or more dedicated data parking sections. The storage device further comprises a first volatile memory unit and a controller coupled to the first volatile memory unit and the non-volatile storage unit. The controller comprises a second volatile memory unit. The controller is configured to receive a first write command corresponding to a first zone within a plurality of zones and generate XOR or parity data associated with the first zone, the XOR or parity data corresponding to the first write command. The controller is further configured to copy the XOR or parity data to a first location in the one or more dedicated data parking sections and copy the XOR or parity data to a first location in the second volatile memory unit.

In another embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. The non-volatile storage unit comprises one or more dedicated data parking sections. The storage device further comprises a first volatile memory unit and a controller coupled to the non-volatile storage unit and the first volatile memory unit. The controller is configured to receive one or more write commands associated with one or more zones of the plurality of and generate XOR or parity data associated with the one or more zones for each of the one or more write commands in the first volatile memory unit. The controller is further configured to copy the XOR or parity data associated with the one or more zones from the first volatile memory unit to the one or more dedicated data parking sections sequentially and copy previously generated XOR or parity data associated with the one or more from the one or more dedicated data parking sections to the first volatile memory unit when one or more additional write commands are received to write data to the one or more zones. The controller is also configured to update the previously generated XOR or parity data for each of the one or more additional write commands in the first volatile memory unit and copy the updated previously generated XOR or parity data for each of the one or more additional write commands to the one or more dedicated data parking sections sequentially.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a table illustrating the SLC parking location and erase block location of XOR or parity data, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller comprising first random access memory (RAM1), second random access memory (RAM2), and a storage unit divided into a plurality of zones. A first command to write data to a first zone is received, first parity data for the first command is generated in the RAM1, and the data of the first command is written to the first zone. When a second command to write data to a second zone is received, the generated first parity data is copied from the RAM1 to a parking section in the storage unit, and second parity data associated with the second zone is copied from the parking section to the RAM1. The second parity data is then updated in the RAM1 with the data of the second command and copied to the parking section.

Figure 1:
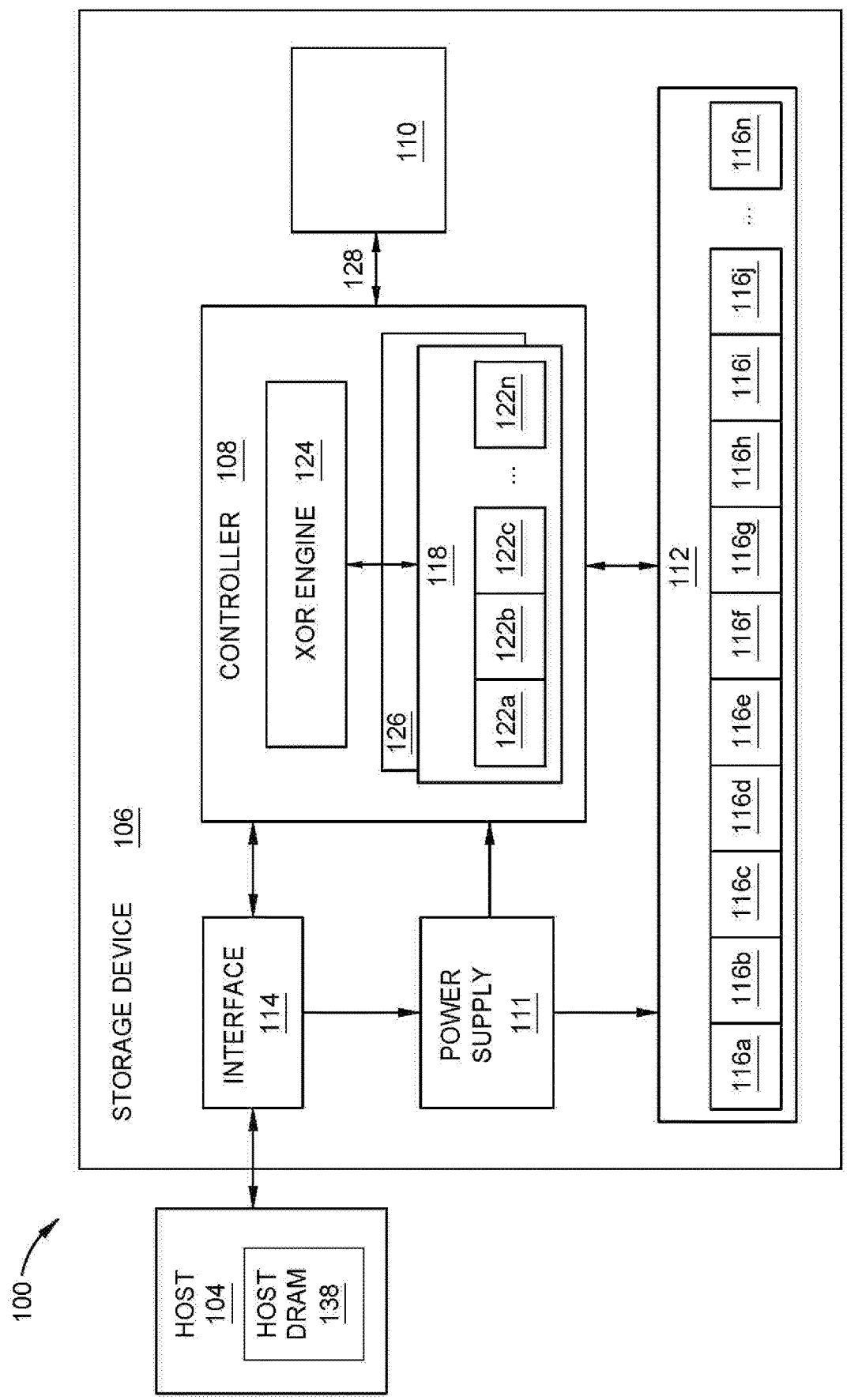
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory (NVM), included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, a first random-access memory (RAM) or volatile memory 112, such as a dynamic random-access memory (DRAM), and an interface 114. The controller 108 may comprise a parity engine or XOR engine 124 and a second RAM or volatile memory 118, such as a static random-access memory (SRAM). In the following descriptions, a first RAM or volatile memory 112 is referenced to as DRAM and a second RAM or volatile memory 118 is referenced as SRAM for simplification and exemplary purposes. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 2.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each of the memory devices may be configured to store relatively large amounts of data (e.g., 128 MB, 256 MB, 412 MB, 1 GB, 2 GB, 3 GB, 8 GB, 16 GB, 22 GB, 54 GB, 128 GB, 256 GB, 412 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, hard disk drives (HDD), and any other type of non-volatile memory devices.

The NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), quad level cell (QLC), or other higher iterations of level cell. The controller 108 may write data to and read data from NAND flash memory devices at the page level and erase data from NAND flash memory devices at the block level.

A portion of the NVM 110 may be formatted into logical blocks such that a capacity of the NVM 110 is divided into a plurality of zones. Each of the zones comprise a plurality of physical or erase blocks of the NVM 110, and each of the erase blocks are associated a plurality of logical blocks. Each of the logical blocks is associated with a unique LBA or sector. Each of the zones may have a size aligned to the capacity of one or more erase blocks of the NVM 110. When the controller 108 receives a command, such as from a host device 104, the controller 108 can read data from and write data to the plurality of logical blocks associated with the plurality of erase blocks of the NVM 110.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory, which may be used by controller 108 to store information. Volatile memory may be comprised of one or more volatile memory devices. In some examples, the controller 108 may use volatile memory as a cache. For instance, the controller 108 may store cached information in volatile memory until cached information is written to the NVM 110. Examples of volatile memory 112 include, but are not limited to, RAM, DRAM 112, SRAM 118, and synchronous dynamic RAM (SDRAM (e.g., DDR1, DDR2, DDR3, DDR3L, LPDDR3, DDR4, LPDDR4, DDR5, LPDDR5 and the like)). As illustrated in FIG. 1, volatile memory may consume power received from the power supply 111.

The various types of volatile memories may be used with different access properties. For example, DRAM 112 may be arranged for longer burst accesses to allow for improved bandwidth (BW) of the same access bus. Alternatively, DRAM 112 may be used with smaller accesses such that random small accesses may have better latency. The controller 108 comprises additional optional SRAM and/or embedded MRAM 126. Embedded MRAM 126 is another alternative memory that may be used in another embodiment. Similarly, the access to the MRAM 126 can be optimized for different design purposes, but the quantity of embedded MRAM 126 in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus 128. The controller 108 may comprise of an XOR engine 124. The data may be stored in either DRAM 112, SRAM 118, or both DRAM 112 and SRAM 118. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110.

The controller 108 may include a XOR engine 124 with logic and/or features to generate XOR parity information. The XOR engine 124 is a type of parity engine and is called out as a XOR engine for exemplary purposes. However, the XOR engine 124 may include other embodiments that the parity engine comprises. Exclusive OR (XOR) parity information may be used to improve reliability of storage device 106, such as enabling data recovery of failed writes or failed reads of data to and from NVM or enabling data recovery in case of power loss. The reliability may be provided by using XOR parity information generated or computed based on data stored to storage device 106. Data may pass through the XOR engine 124 to be written to the NVM 110. The XOR engine 124 may generate a parity stream to be written to the SRAM 118. The SRAM 118 and the NVM 110 may each contain a plurality of regions or a plurality of locations which data may be written to. Data may be transferred from an SRAM region 122a-122n in the SRAM 118 to a NVM 110 location, and vice-versa.

The SRAM 118, DRAM 112, and NVM 110 each individually comprises one or more dies. Each of the one or more dies comprises one or more ranks which is comprised of one or more banks. The banks are composed of rows and pages. The SRAM 118 in the controller 108 may be logically or physical separated into different SRAM areas or regions 122a-122n for use by the controller 108. Similarly, the DRAM 112 may be logically or physical separated into different DRAM areas or regions 116a-116n for use by the controller 108. The MRAM inside of the controller 108 may be logically or physical separated into different MRAM areas or regions (not shown). External attachments of MRAM often have a vendor specific structure and access not covered here.

Figure 2:
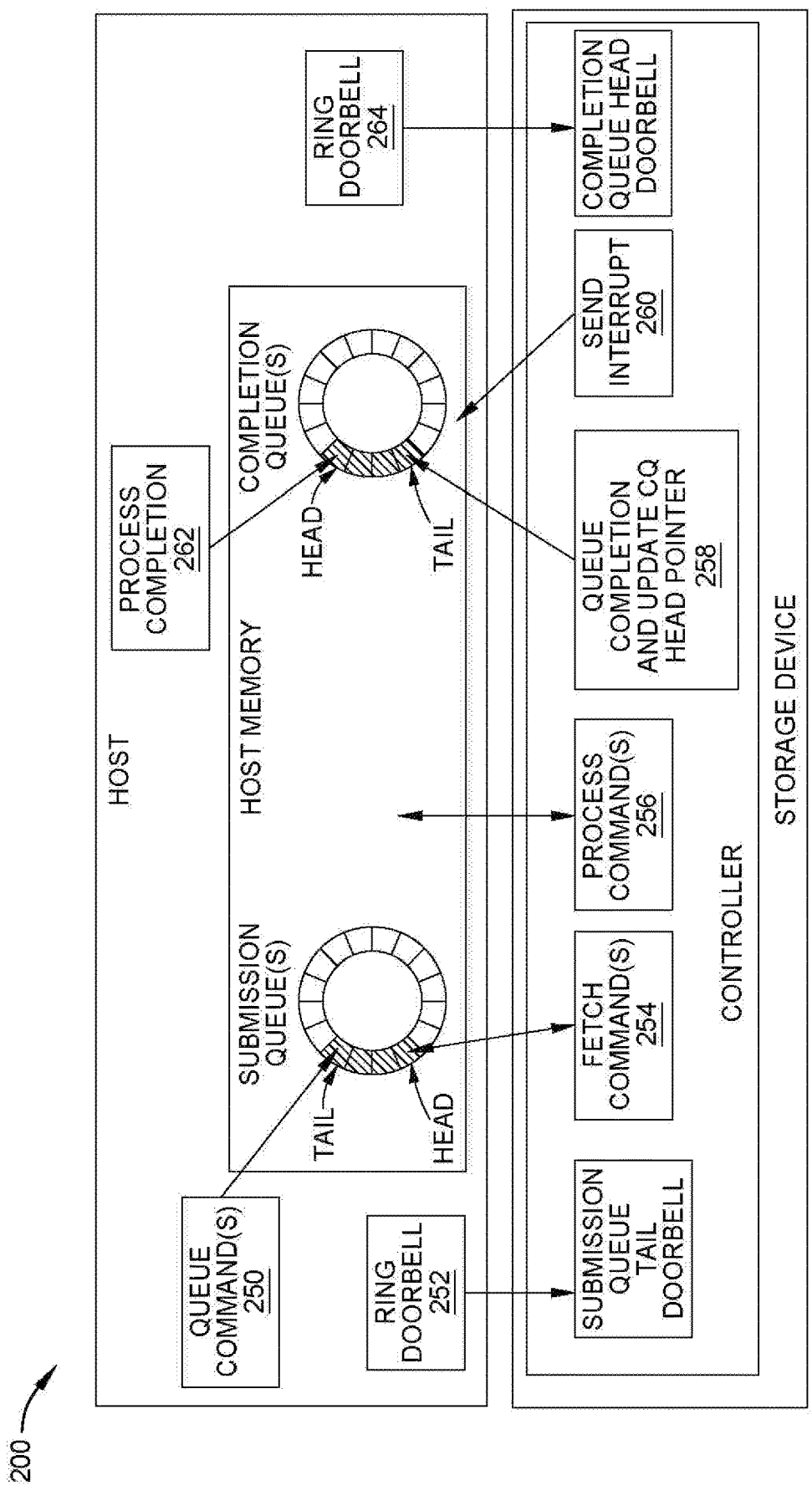
FIG. 2 is a block diagram illustrating a method of operating a storage device to execute a read or write command, according to one embodiment.

FIG. 2 is a block diagram illustrating a method 200 of operating a storage device to execute a read or write command, according to one embodiment. Method 200 may be used with the storage system 100 having a host device 104 and a storage device 106 comprising a controller 108. Method 200 may be used with the device a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block address (LBA) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3A:
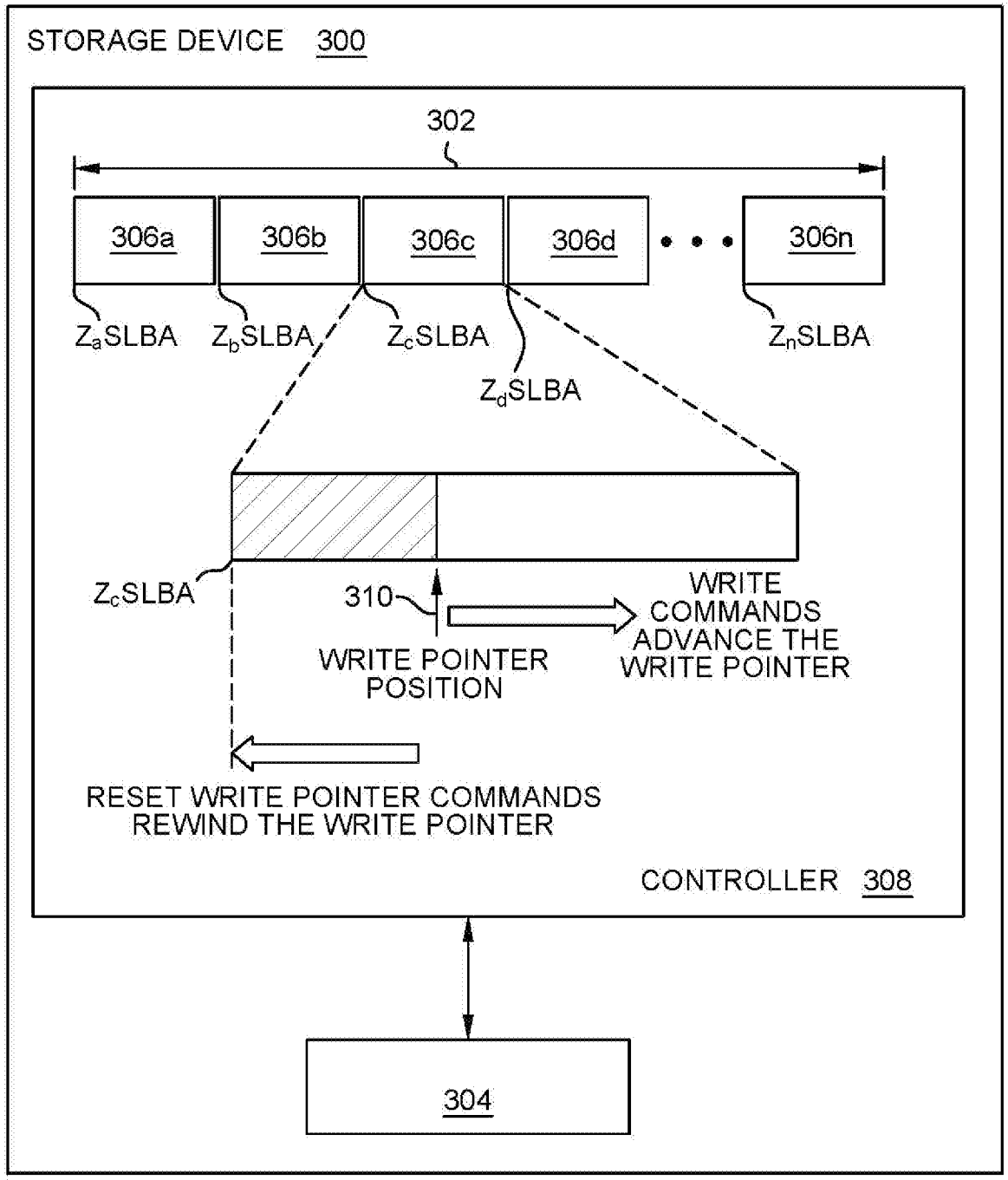
FIG. 3A illustrates a zoned namespaces utilized in a storage device, according to one embodiment.
Figure 3B:
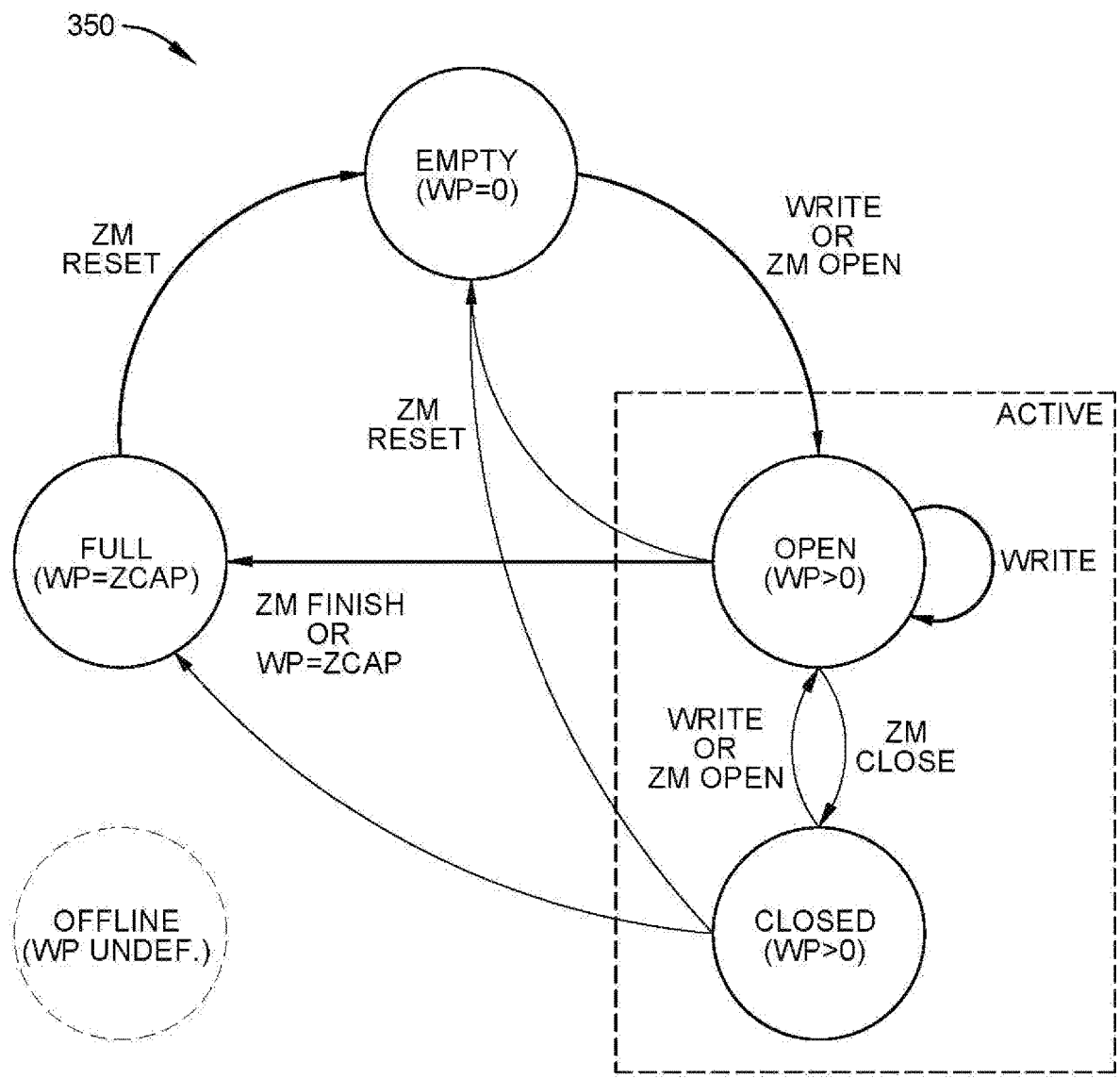
FIG. 3B illustrates a state diagram for the zoned namespaces of the storage device of FIG. 3A, according to one embodiment.

FIG. 3A illustrates a Zoned Namespaces (ZNS) 302 view utilized in a storage device 300, according to one embodiment. The storage device 300 may present the ZNS 302 view to a host device. FIG. 3B illustrates a state diagram 350 for the ZNS 302 of the storage device 300, according to one embodiment. The storage device 300 may be the storage device 106 of the storage system 100 of FIG. 1. The storage device 300 may have one or more ZNS 302, and each ZNS 302 may be different sizes. The storage device 300 may further comprise one or more conventional namespaces in addition to the one or more Zoned Namespaces 302. Moreover, the ZNS 302 may be a zoned block command (ZBC) for SAS and/or a zoned-device ATA command set (ZAC) for SATA. Host side zone activity may be more directly related to media activity in zoned drives due to the relationship of logical to physical activity possible.

In the storage device 300, the ZNS 302 is the quantity of NVM that can be formatted into logical blocks such that the capacity is divided into a plurality of zones 306a-306n (collectively referred to as zones 306). The NVM may be the storage unit or NVM 110 of FIG. 1. Each of the zones 306 comprise a plurality of physical or erase blocks (not shown) of a memory unit or NVM 304, and each of the erase blocks are associated a plurality of logical blocks (not shown). Each of the zones 306 may have a size aligned to the capacity of one or more erase blocks of a NVM or NAND device. When the controller 308 receives a command, such as from a host device (not shown) or the submission queue of a host device, the controller 308 can read data from and write data to the plurality of logical blocks associated with the plurality of erase blocks (EBs) of the ZNS 302. Each of the logical blocks is associated with a unique LBA or sector.

In one embodiment, the NVM 304 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 306 to track where the data is located within the NVM 304. Data may be written to one zone 306 at a time until a zone 306 is full, or to multiple zones 306 such that multiple zones 306 may be partially full. Similarly, when writing data to a particular zone 306, data may be written to the plurality of erase blocks one block at a time, in sequential order of NAND locations or wordline-by-wordline, until moving to an adjacent block (i.e., write to a first erase block until the first erase block is full before moving to the second erase block), or to multiple blocks at once, in sequential order of NAND locations or wordline-by-wordline, to partially fill each block in a parallel fashion (i.e., writing the first NAND location of each erase block before writing to the second NAND location of each erase block). This sequential programming of every NAND location is a typical non-limiting requirement of many NAND EBs.

When a controller 308 selects the erase blocks that will store the data for each zone, the controller 308 will be able to choose the erase blocks either at the zone open time, or it may choose the erase blocks as it reaches a need to fill the first NAND location or wordline of that particular erase block. This may be more differentiating when the above described method of filling one erase block completely prior to starting the next erase block is utilized. The controller 308 may use the time difference to select a more optimal erase block in a just-in-time basis. The decision of which erase block is allocated and assigned for each zone and its contiguous LBAs can be occurring for zero or more concurrent zones at all times within the controller 308.

Each of the zones 306 is associated with a zone starting logical block address (ZSLBA) or zone starting sector. The ZSLBA is the first available LBA in the zone 306. For example, the first zone 306a is associated with $Z_a$SLBA, the second zone 306b is associated with $Z_b$SLBA, the third zone 306c is associated with $Z_c$SLBA, the fourth zone 306d is associated with $Z_d$SLBA, and the $n^{th}$ zone 306n (i.e., the last zone) is associated with $Z_n$SLBA. Each zone 306 is identified by its ZSLBA, and is configured to receive sequential writes (i.e., writing data to the NVM 110 in the order the write commands are received).

As data is written to a zone 306, a write pointer 310 is advanced or updated to point to or to indicate the next available block in the zone 306 to write data to in order to track the next write starting point (i.e., the completion point of the prior write equals the starting point of a subsequent write). Thus, the write pointer 310 indicates where the subsequent write to the zone 306 will begin. Subsequent write commands are 'zone append' commands, where the data associated with the subsequent write command appends to the zone 306 at the location the write pointer 310 is indicating as the next starting point. An ordered list of LBAs within the zone 306 may be stored for write ordering. Each zone 306 may have its own write pointer 310. Thus, when a write command is received, a zone is identified by its ZSLBA, and the write pointer 310 determines where the write of the data begins within the identified zone.

FIG. 3B illustrates a state diagram 350 for the ZNS 302 of FIG. 3A. In the state diagram 350, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 308 comprises the ZM. Zone metadata may be stored in the ZM and/or the controller 308.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 300 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the XOR data and one or more excluded erase blocks. For example, if the total capacity of a zone 306 is 512 MiB, the ZCAP may be 470 MiB, which is the capacity available to write data to, while 42 MiB are unavailable to write data. The writeable capacity (ZCAP) of a zone is equal to or less than the total zone storage capacity. The storage device 300 may determine the ZCAP of each zone upon zone reset. For example, the controller 308 or the ZM may determine the ZCAP of each zone. The storage device 300 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 300 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 300. The storage device 300 may mark one or more erase blocks for erasure. When a new zone is going to be formed and the storage device 300 anticipates a ZM open, the one or more erase blocks marked for erasure may then be erased. The storage device 300 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 310 for the zone 306 may be selected, enabling the zone 306 to be tolerant to receive commands out of sequential order. The write pointer 310 may optionally be turned off such that a command may be written to whatever starting LBA is indicated for the command.

Referring back to FIG. 3A, when the host sends a write command to write data to a zone 306, the controller 308 pulls-in the write command and identifies the write command as a write to a newly opened zone 306. The controller 308 selects a set of EBs to store the data associated with the write commands of the newly opened zone 306 to, and the newly opened zone 306 switches to an active zone 306. The write command may be a command to write new data, or a command to move valid data to another zone for garbage collection purposes. The controller 308 is configured to DMA read new commands from a submission queue populated by a host device.

In an empty zone 306 just switched to an active zone 306, the data is assigned to the zone 306 and the associated set of sequential LBAs of the zone 306 starting at the ZSLBA, as the write pointer 310 is indicating the logical block associated with the ZSLBA as the first available logical block. The data may be written to one or more erase blocks or NAND locations that have been allocated for the physical location of the zone 306. After the data associated with the write command has been written to the zone 306, a write pointer 310 is updated to point to the next LBA available for a host write (i.e., the completion point of the first write). The write data from this host write command is programmed sequentially into the next available NAND location in the erase block selected for physical backing of the zone.

In some embodiments, a NAND location may be equal to a wordline. In such an embodiment, the controller may optionally aggregate several write commands in another memory location such as DRAM or SRAM prior to programming a full wordline composed of multiple write commands. Write commands that are longer than a wordline will be able to program and fill a complete wordline with some of the data, and the excess data beyond a wordline will be used to fill the next wordline. For the purposes of this description, the write data sizes are equal to a NAND location of 512 bytes; however, this is not intended to be limiting.

For example, the controller 308 may receive a first write command to a third zone 306c, or a first zone append command. The host identifies sequentially which logical block of the zone 306 to write the data associated with the first command to. The data associated with the first command is then written to the first or next available LBA(s) in the third zone 306c as indicated by the write pointer 310, and the write pointer 310 is advanced or updated to point to the next available LBA available for a host write (i.e., WP>0). If the controller 308 receives a second write command to the third zone 306c, or a second zone append command, the data associated with the second write command is written to the next available LBA(s) in the third zone 306c identified by the write pointer 310. Once the data associated with the second command is written to the third zone 306c, the write pointer 310 once again advances or updates to point to the next available LBA available for a host write. Resetting the third zone 306c moves the write pointer 310 back to the $Z_cSLBA$ (i.e., WP=0), and the third zone 306c switches to an empty zone.

FIGS. 4A-4D illustrate a schematic block diagram of generating and/or updating parity data or XOR data, in either a second RAM or volatile memory and/or NVM, according to various embodiments. The system 100 of FIG. 1 will be used in accordance with FIGS. 4A-4F. In the following descriptions, a non-volatile storage unit 110 is referred to as a NVM, a first RAM or volatile memory 112 (i.e., a first RAM1) is referred to as DRAM, and a second RAM or volatile memory 118 (i.e., a second RAM2) is referred to as SRAM for simplification and exemplary purposes.

The phrase "XOR or parity data" is utilized throughout as an example of data in flight, and is not intended to be limiting, as other forms of data in flight may be relevant. In other words, the XOR or parity data discussed in the examples below is data in flight and may include unwritten host data. Unwritten user or host data may comprise small lengths or amount of data (e.g., less than the size of one or more wordlines) that are stored in a parking location or buffer, such as a region dedicated to data in flight in the SRAM (not shown), until the aggregated size of the data reaches a minimum size (e.g., the size of one or more wordlines), in which case the unwritten user data is written to the NVM 110.

The XOR data or parity data, deemed as data in flight, is considered the parity buffer and may protect the loss of data due to data corruption, erroneous bit transfer, power loss, and other causes of data loss. The XOR data or parity data may be generated or updated in the SRAM, and temporarily stored in the SRAM and/or DRAM before being copied to the NVM 110, for example. Furthermore, in case of power failure, capacitors (not shown) located within the storage device, such as the storage device 106 of FIG. 1, may store an adequate amount of energy to program data from the DRAM, such as the DRAM 112 of FIG. 1, to the NVM 110 to help prevent data loss, for example.

The NVM 110 comprises one or more dedicated data parking sections for parking the data in flight, which may be SLC memory 402. The term "parking" as used herein refers to a swapping of where the active zone information is stored. For example, data or information stored in the SRAM 118 may be parked in the DRAM 112, and data or information stored in the DRAM 112 may be parked in the SLC memory section 402. The SLC memory 402 referenced is an example of an embodiment of the one or more dedicated data parking sections; however, the one or more dedicated data parking sections may be MLC, TLC, QLC, etc. The one or more dedicated data parking sections of SLC memory 402 comprises a plurality of SLC parking locations 404a-404n. Such terminology is not meant to be limiting, but to provide an example of a possible embodiment of the reference.

Figure 4A:
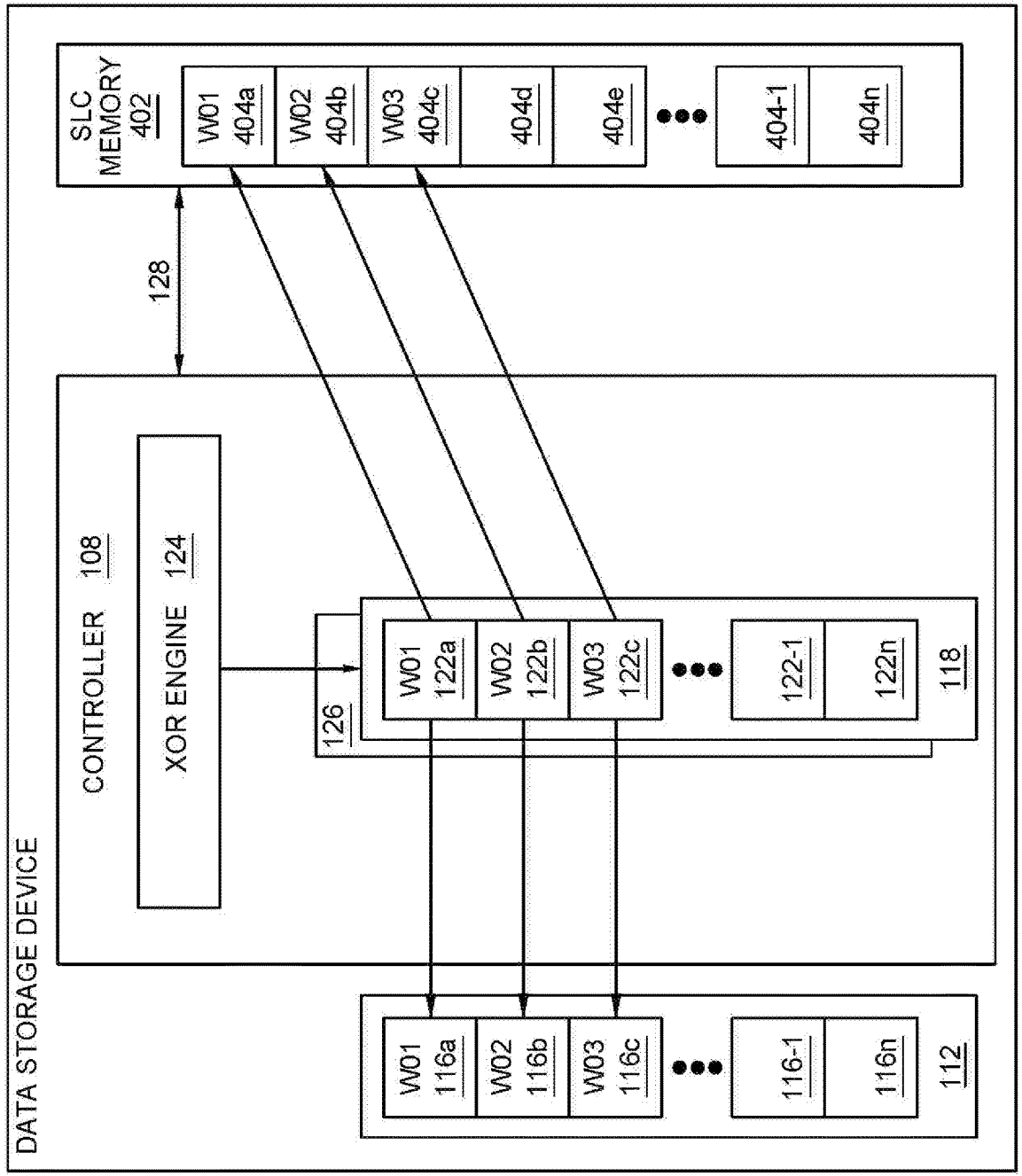
FIGS. 4A-4D illustrate a schematic block diagram of generating and/or updating parity data or XOR data in the memory units of the storage device.
Figure 4B:
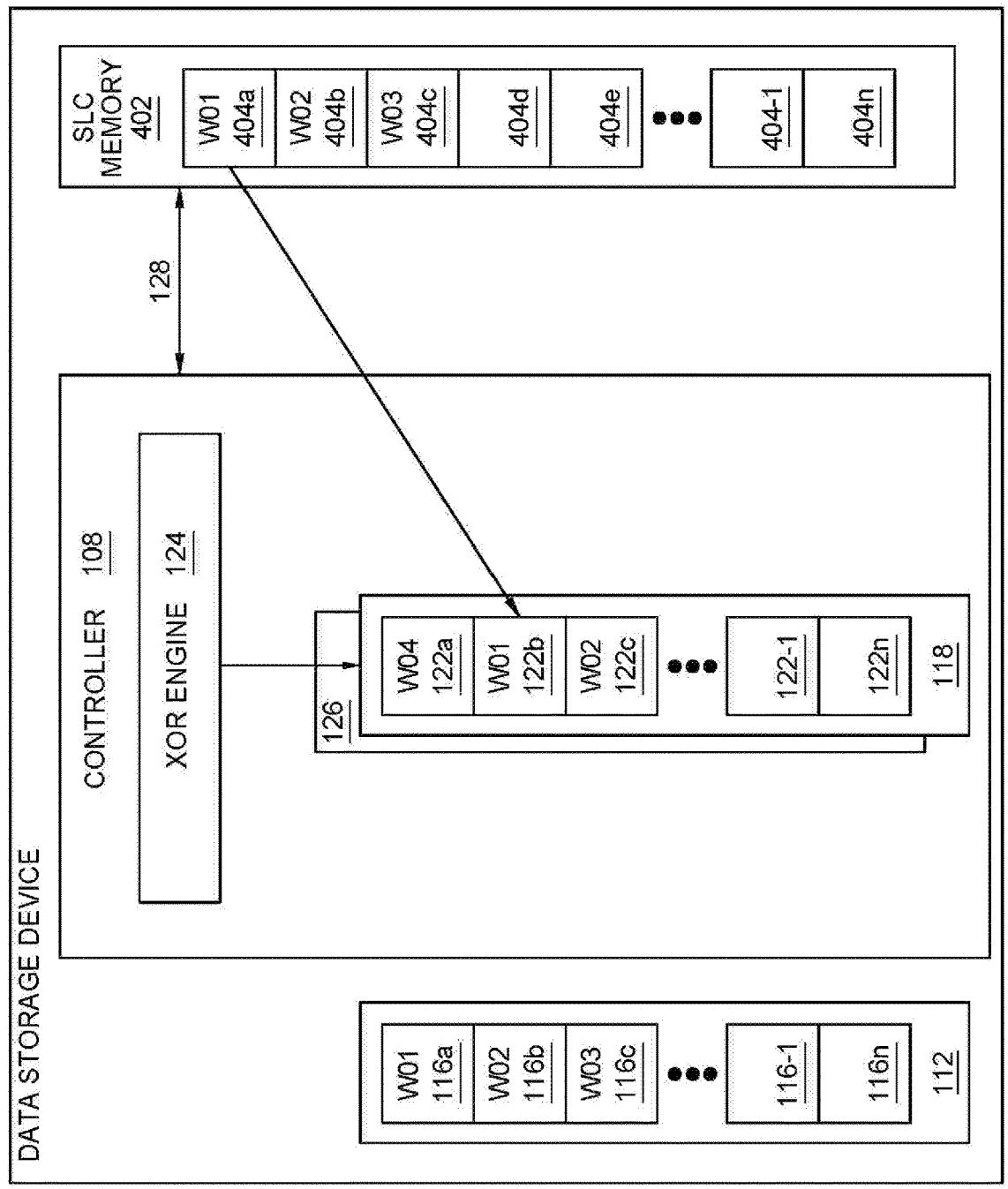
Figure 4C:
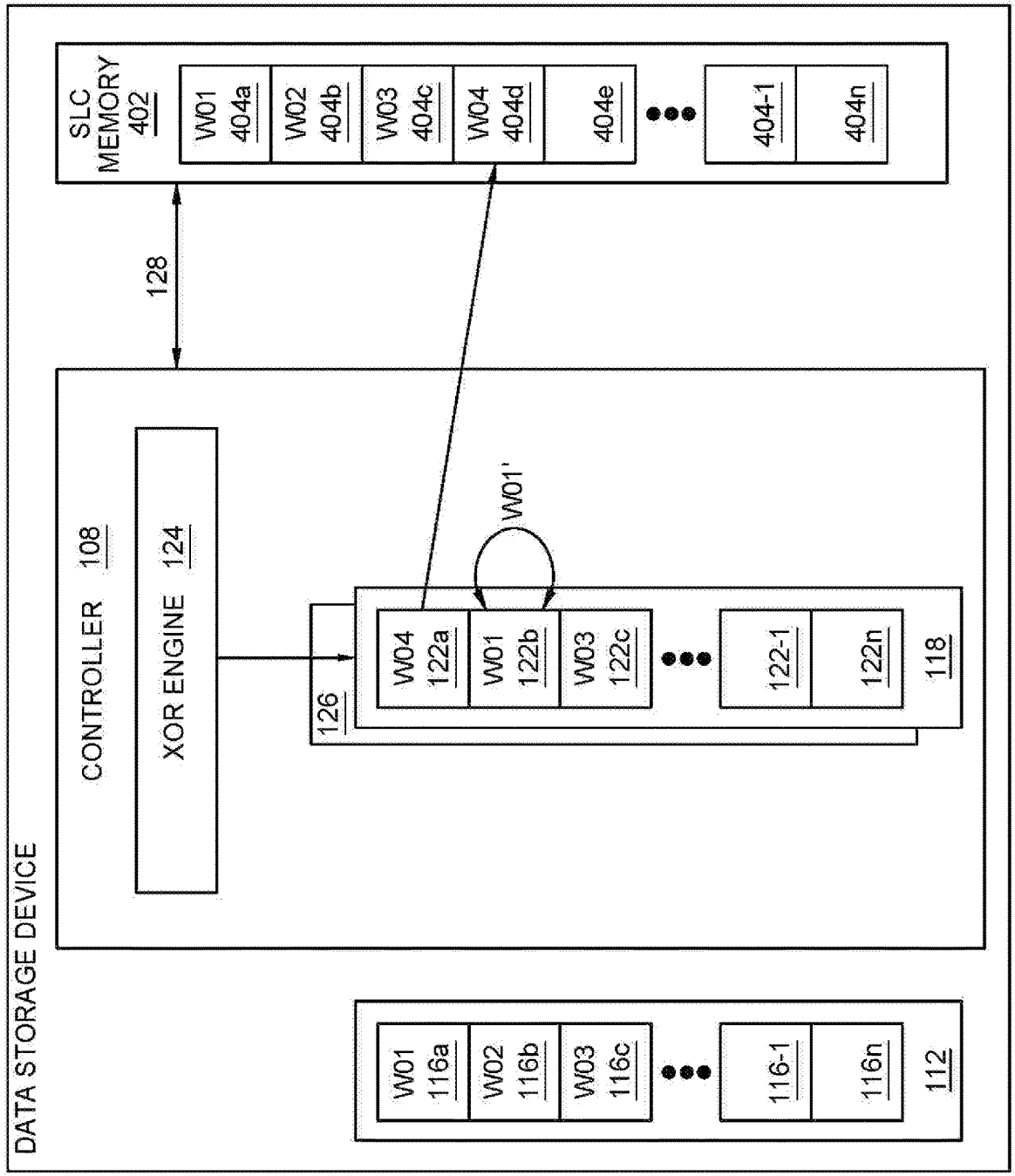
Figure 4D:
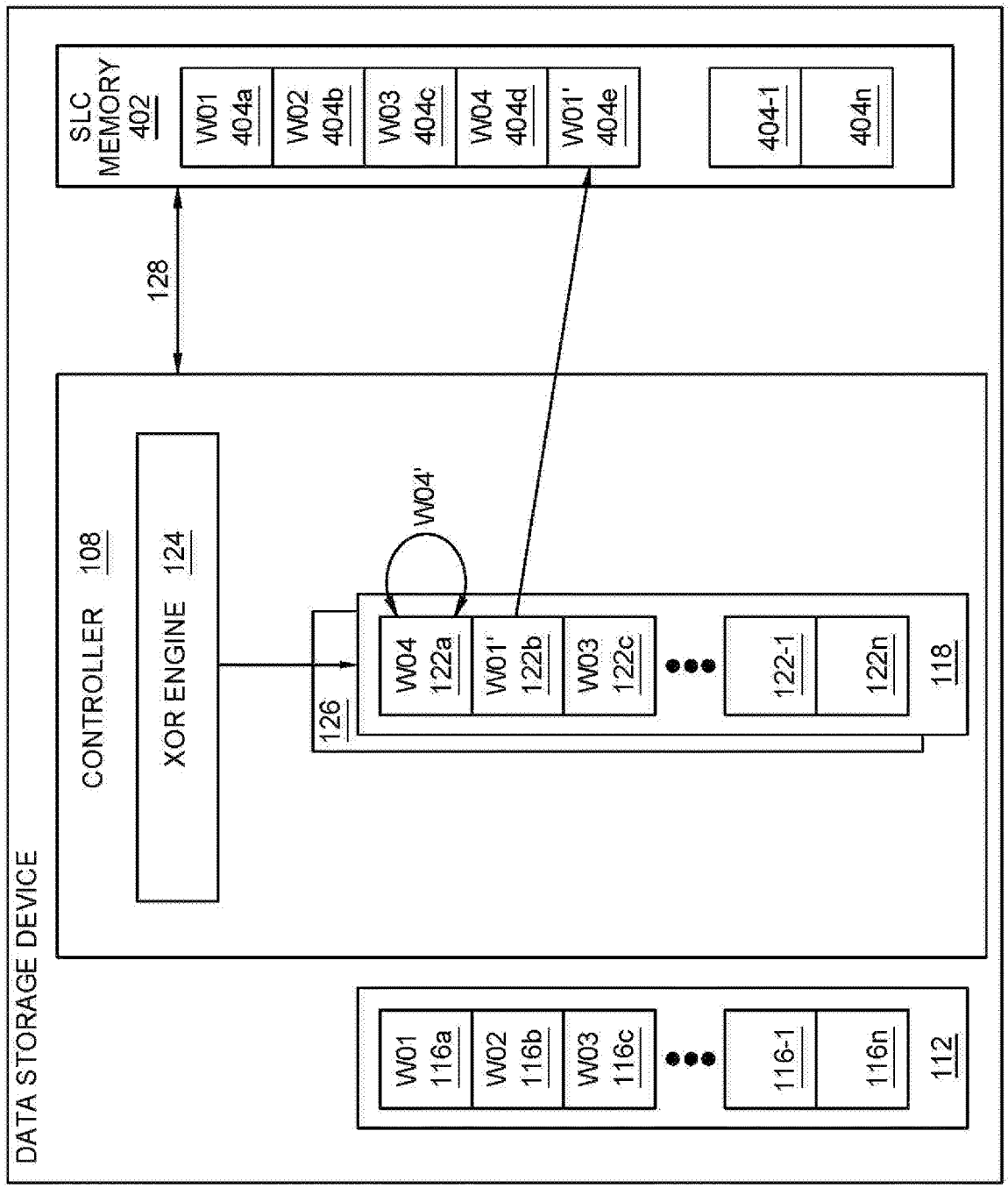

In FIGS. 4A-4D, parity data or XOR data is denoted by "Wxx" where "x" represents the write ID of an associated command received from the host device. Parity or XOR data may be stored in either a SRAM region 122a-122n, a DRAM region 116a-116n, a SLC memory location 404a-404n, or in any combination of the locations previously mentioned. A SRAM region 122a-122n, a DRAM region 116a-116n, and a SLC memory location 404a-404n may be any suitable size, such as 512 bytes. In FIGS. 4C-4D, the prime symbol or single quotation mark (') represents updated parity or XOR data within any of the following locations: a SRAM region 122a-122n, a DRAM region 116a-116n, and a SLC memory location 404a-404n. Parity or XOR data may be updated multiple times as needed and may be described herein with the corresponding number of prime symbols or single quotation marks (') that matches the number of updates.

The storage device 106 receives one or more commands from a host device 104, and the one or more commands pass through the XOR engine 124 within the controller 108 before being written to the NVM 110. Each of the one or more commands identifies which zone in the NVM 110 the data associated with the commands should be stored. Each zone comprises XOR or parity data to protect the user data stored within the zone. When the write data associated with the one or more commands passes through the XOR engine 124, the XOR engine 124 continuously generates or updates XOR data or parity data for the identified zone associated with each of the commands. Simultaneously, the write data associated with each of the commands is written to the identified zone in the NVM 110.

In one embodiment, each SLC parking location 404a-404n may be associated with an active and closed state (e.g., not currently utilized) zone, such as zone 306a of FIG. 3A. In such an embodiment, each SLC parking location 404a-404n may be one or more erase blocks within each zone. For example, an SLC parking location 404a-404n may be one erase block from each plane of a die within a zone. Each zone may therefore comprise a plurality of dies for storing user data, a XOR NAND die for storing XOR data, and one or more erase blocks within a die used as the dedicated XOR or parity data parking section. Thus, there may be a plurality of dedicated data parking sections, where each zone comprises one dedicated data parking section. As such, while the SLC memory 402 is shown to comprise the SLC parking locations 404a-404n grouped together in the SLC memory 402 in FIGS. 4A-4D, each SLC parking location 404a-404n may be separated and within each individual zone instead.

In another embodiment, each SLC parking location 404a-404n may be within a single zone, in which case there is one dedicated data parking section, like shown in FIGS. 4A-4D. In such an embodiment, one entire zone is dedicated to storing the data for all of the other zones storing user data. Thus, the SLC memory unit 402 shown in FIGS. 4A-4D may be a zone. Each zone storing user data comprises a plurality of dies used to store the user data and one die used to store XOR data while the SLC memory 402 is a zone used as the dedicated data parking section.

To keep track of where the data in flight (e.g., XOR or parity data) of each zone is currently stored, an LBA table stored in the controller 108 uses LBA pointers to point to or indicate the current location of the data in flight stored in the SLC parking locations 404a-404n. As new and updated data in flight for a zone is written to a SLC parking location 404a-404n, the LBA table is updated with the location of the new and updated data in flight within the SLC parking locations 404a-404n, and the LBA pointer pointing to the outdated data in flight for the zone in the LBA table is invalidated. The controller 108 may check the LBA table for invalid LBA pointers (i.e., updated data exists elsewhere with a valid LBA pointer). Data in flight is written to the next available wordline or empty location that is available for data within the SLC memory 404a-404n. In other words, data in flight is written sequentially to the SLC parking locations 404a-404n, whereas data in flight can be written sequentially or randomly to the SRAM 118 and the DRAM 112. Thus, each time data in flight for a zone is updated, the updated data in flight must be written to the next available wordline or location in the SLC parking location 404a-404n, and cannot be re-written over the previous or outdated data in flight within the SLC parking locations 404a-404n for that zone.

The SLC memory 402 stores XOR data that may also exist in a DRAM region 116a-116n and/or a SRAM region 122a-122n. However, if the storage device experiences an unplanned power loss, the data in both the SRAM 118 and the DRAM 112 will be flushed or copied to the NVM 110. The storage device 106 may comprise capacitors that store enough power to program all the data from the DRAM 112 or the SRAM 118 to the NVM 110 in the event of a power failure. In the case that the capacitors fail or do not have enough power stored to program all the data stored in the SRAM 118 and/or the DRAM 112 to the NVM 110, the XOR data will be lost. To ensure recovery of user data, a non-volatile memory, such as a SLC memory, should be used to store data in flight as well.

A zone may be opened and remain active and currently utilized, in which case, the data of the zone may remain in the SRAM 118 without being "parked" in the SLC memory 402 until the zone is filled. The SLC memory 402 may have a greater size than the SRAM 118. Thus, the active zones currently being used (e.g., receiving write commands to write data to) may utilize the SRAM 118 while the closed zones not currently being used (e.g., not receiving a command to write data to) may be parked in the SLC memory 402.

In FIG. 4A, the storage device 106 receives a first write command to write data to a first zone, such as the first zone 306a of FIG. 3A. The XOR engine 124 generates first parity data W01 or XOR data associated with the first zone for the first write command. The first parity data W01 is written to an available SRAM region 122a-112n in the SRAM 118, such as the first SRAM region 122a. After the first parity data W01 is written to the first SRAM region 122a, the first parity data W01 is copied to the first available SLC parking location 404a. Simultaneously, as the first parity data W01 is copied to the first SLC parking location 404a, the first parity data W01 is optionally copied from the first SRAM region 122a to an available region in the DRAM 112, such as a first DRAM region 116a. Copying the first parity data W01 to both the SLC memory 402 and the DRAM 112 ensures the user data stored in the first zone will be protected during a power failure event. The controller 108 then updates the LBA table with the location of the first parity data W01 in the SLC memory 402.

The storage device 106 then receives a second write command associated with a second zone, such as a second zone 306b of FIG. 3A. The second write command may be received while the first parity data W01 is copied to the first SLC parking location 404a or after the first parity data W01 is written to the first SLC parking location 404a and/or the first DRAM region 116a. Second parity data W02 associated with the second zone for the second write command is then written to a second SRAM region 122b in the SRAM 118. After the second parity data W02 is written to the second SRAM region 122b, the second parity data W02 is copied to the second SLC parking location 404b. Simultaneously, as the second parity data W02 is copied to the second SLC parking location 404b, the second parity data W02 is optionally copied from the second SRAM region 122b to an available region in the DRAM 112, such as the second DRAM region 116b. Copying the second parity data W02 to both the SLC memory 402 and the DRAM 112 ensures the user data stored in the second zone will be protected during a power failure event. The controller 108 then updates the LBA table with the location of the second parity data W02 in the SLC memory 402.

The storage device 106 receives a third write command associated with a third zone, such as zone 306c of FIG. 3A. The third write command may be received while the second parity data W02 is copied to the second SLC parking location 404b or after the second parity data W02 is written to the second SLC parking location 404b and/or the second DRAM region 116b. Third parity data W03 associated with the third write command is written to a third SRAM region 122c in the SRAM 118. After the third parity data W03 is written to the third SRAM region 122c, the third parity data W03 is copied to a third SLC parking location 404c. Simultaneously, as the third parity data W03 is copied to the third SLC parking location 404c, the third parity data W03 is optionally copied from the third SRAM region 122c to an available region in the DRAM 112, such as the third DRAM region 116c. Copying the third parity data W03 to both the SLC memory 402 and the DRAM 112 ensures the user data stored in the third zone will be protected during a power failure event. The controller 108 then updates the LBA table with the location of the third parity data W03 in the SLC memory 402.

In FIG. 4B, the storage device 106 receives a fourth command associated with a fourth zone, such as a fourth zone 306d of FIG. 3A. The XOR engine 124 generates fourth XOR or parity data W04 associated with the fourth zone for the fourth command. The fourth parity data W04 may either be written to an available SRAM region 122a-122n (i.e., a region that does not contain written data) or to an existing SRAM region where XOR data has been successfully copied to a SLC memory location 404a-404n. Previously copied XOR data in the existing region in a SRAM region 122a-122n may be erased by the controller 108 or the XOR engine 124. For example, the first parity data W01 in the first SRAM region 122a has been successfully written to the first SLC parking location 404a. The fourth parity data W04 associated with the fourth zone may then be written to the first SRAM region 122a, where the first parity data W01 was previously stored.

The storage device 106 receives a fifth command to write data to the first zone. Since the first parity data W01 is no longer stored in the SRAM 118, the first parity data W01 corresponding to the first zone is copied from its location in the SLC memory 402 back to an available SRAM region 122a-122n, such as the second SRAM region 122b. In FIG. 4C, the fourth parity data W04 or XOR data associated with the fourth zone is copied to the next available location in the SLC memory 402. The fourth parity data W04 is written sequentially to the SLC memory 402 at the fourth SLC parking location 404d. The controller then records the location of the fourth parity data W04 in the LBA table. Simultaneously, The first parity data W01 or XOR data corresponding to the first zone in the second SRAM region 122b is updated with the fifth command as updated first parity data W01'. The single quotation mark or the prime mark (') denotes that XOR data or parity data has been updated.

In FIG. 4D, the updated first parity data W01' or XOR data is written to the SLC memory 402 to the fifth SLC parking location 404e. Unlike writing to the DRAM 112, XOR data or parity data is written to the next available SLC parking location 404a-404n and cannot be written to a previous location. The controller utilizes a LBA pointer to track the location of valid XOR or parity data within the LBA table. When the first parity data W01 or XOR data is updated with the new data associated with the fifth command as updated first parity data W01', the controller 108 updates the LBA pointer associated with the first zone in the LBA table to the location of the updated first parity data W01', as the first parity data W01 is outdated and no longer valid.

In FIG. 4D, the storage device 106 receives a sixth command to write data to the fourth zone. Since the fourth parity data W04 or XOR data is still currently stored in the first SRAM region 122a (i.e., has not been erased from the SRAM 118), the fourth parity data W04 or XOR data can be updated in its current SRAM region 122a without having to copy the fourth parity data W04 or XOR data from the SLC memory 402. The fourth parity data W04 associated with the fourth zone is then updated with the sixth command as updated fourth parity data W04'. Upon copying the updated fourth parity data W04' to a sixth SLC parking location 404f, the controller 108 will update the LBA pointer associated with the fourth zone in the LBA table to the location of the updated fourth parity data W04', as the fourth parity data W04 is outdated and no longer valid.

FIG. 5 is an exemplary LBA table 500 illustrating the SLC parking location of XOR or parity data, according to one embodiment. In the embodiment of FIG. 5, the SLC parking locations are two erase blocks within a zone. XOR or parity data, represented by XOR zone ID 502a-502n in the LBA table 500, is written to a SLC parking location 504a-504m, indicated by the middle column in the table. The XOR or parity data is also denoted by its erase block location 506a-506p.

The values for XOR zone ID 502a-506n, SLC parking location 504a-504m, and erase block 506a-506p are arbitrary values to help depict the example given. The values may be represented differently and are not intended to be limiting. For example, first XOR data X0 502a associated with a first zone0 is located in a first SLC parking location S1 504a and a first erase block 1 506a. Furthermore, second XOR or parity data X1 502b, 502j associated with a second zone1 is located in a second SLC parking location S2 504b and the first erase block EB1 506a, as well as a nineteenth SLC parking location S19 504j and a second erase block EB2 506b.

However, as noted above, the LBA pointer points to the most up-to-date XOR or parity data, and does not point to invalid or outdated data. Thus, the LBA pointer indicates the second XOR or parity data X1 located in the nineteenth SLC parking location S19 504j and the second erase block EB2 506b as the valid data for the second zone1.

The LBA table 500 further illustrates that XOR or parity data is written sequentially to the SLC parking locations. For example, third XOR or parity data X2 502*b*-502*f* associated with a third zone2 is re-written multiple times in sequential order to the SLC parking locations S2-S6 504*b*-504*f* and to the erase block EB1 506*a*. The current location of the third XOR or parity data X2 is reflected by the LBA pointer in the LBA table 500 pointing to the third XOR data X2 502*f* in the sixth SLC parking location S6 504*f* and the first erase block EB1 506*a*.

Furthermore, when the second erase block EB2 506*b* is almost at capacity, the controller searches the first erase block EB1 506*a* for any valid XOR or parity data that has not been updated to a new location within the second erase block EB2 506*b*. For example, the first XOR or parity data X0 has only been written to the first SLC parking location S1 504*a* in the first erase block EB1 506*a*. The first parity data X0 is then copied to the next available SLC parking location in the second erase block EB2 506*b*, such as the twentieth SLC parking location S20 504*k*. After the first parity data X0 is successfully copied to the next available SLC parking location S20 504*k*, a local garbage collection will occur and erase all the data in the first erase block EB1 506*a* since the valid or up-to-date data that was stored in the first erase block EB1 506*a* is now located in the second erase block EB2 506*b*.

In order to protect the loss of data on a storage drive, parity data or XOR data is created utilizing a XOR engine. The parity or XOR data is then written to the SRAM from the XOR engine. The data in flight, including the parity or XOR data, may be copied to the NVM and/or the DRAM from the SRAM, pulled from the NVM and/or the DRAM to the SRAM to be updated, and/or updated within the SRAM. By writing the data in flight to a SLC parking location within the NVM, the data in flight is protected against a device power failure.

In one embodiment, a storage device comprises a non-volatile storage unit. The capacity of the non-volatile storage unit is divided into a plurality of zones. The non-volatile storage unit comprises a plurality of dies, and each of the plurality of dies comprises a plurality of erase blocks. The storage device further comprises a first volatile memory unit and a controller coupled to the non-volatile storage unit and the first volatile memory unit. The controller is configured to receive a first write command to write data to a first zone of the plurality of zones and copy the first XOR or parity data associated with the first zone from a first data parking section in the non-volatile storage unit to the first volatile memory unit. The controller is further configured to update the first XOR or parity data associated with the first zone with new XOR or parity data associated with the first write command in the first volatile memory unit and copy the updated first XOR or parity data associated with the first zone from the first volatile memory unit to the first data parking section in the non-volatile storage unit.

The data parking section in the non-volatile storage unit comprises one or more erase blocks within the first zone. The controller is further configured to update a current location of the updated first XOR or parity data within the first zone in a logical block address table and copy second XOR or parity data associated with a second zone from a first erase block in the second zone to a second erase block in the second zone, wherein a second data parking section in the non-volatile storage unit comprises the first erase block and the second erase block of the second zone.

The controller is further configured to erase the first erase block of the second zone upon re-writing the second XOR or parity data from the first erase block to the second erase block and update a logical block address table to indicate the second XOR or parity data is currently stored in the second erase block of the second zone. The first XOR or parity data associated with the first zone is stored in a first location of the first data parking section, and the updated first XOR or parity data is copied to a second location in the first data parking section. The first location and the second location are sequential.

In another embodiment, a storage device comprises a non-volatile storage unit. The capacity of the non-volatile storage unit is divided into a plurality of zones. The non-volatile storage unit comprises a plurality of dies, and each of the plurality of dies comprising a plurality of erase blocks. The non-volatile storage unit comprises one or more dedicated data parking sections. The storage device further comprises a first volatile memory unit and a controller coupled to the first volatile memory unit and the non-volatile storage unit. The controller comprises a second volatile memory unit. The controller is configured to receive a first write command corresponding to a first zone within a plurality of zones and generate XOR or parity data associated with the first zone, the XOR or parity data corresponding to the first write command. The controller is further configured to copy the XOR or parity data to a first location in the one or more dedicated data parking sections and copy the XOR or parity data to a first location in the second volatile memory unit.

The non-volatile storage unit is a NAND memory unit. The first volatile memory unit is a SRAM unit and the second volatile memory unit is a DRAM unit. The one or more dedicated data parking sections is a plurality of dedicated data parking sections. Each dedicated data parking section is a SLC die within each zone. The one or more dedicated data parking sections is one dedicated data parking section. The one dedicated data parking section is a first zone that stores all XOR or parity data for each zone storing user data. The controller comprises an XOR engine and the XOR engine is configured to generate and update XOR or parity data for the controller. The controller is further configured to simultaneously write second XOR or parity data associated with a second zone sequentially to a second location of the one or more dedicated data parking sections and write the second XOR or parity data associated with the second zone sequentially or randomly to a second location in the second volatile memory unit.

In another embodiment, a storage device comprises a non-volatile storage unit. The capacity of the non-volatile storage unit is divided into a plurality of zones. The non-volatile storage unit comprises a plurality of dies and each of the plurality of dies comprising a plurality of erase blocks. The non-volatile storage unit comprises one or more dedicated data parking sections. The storage device further comprises a first volatile memory unit and a controller coupled to the non-volatile storage unit and the first volatile memory unit. The controller is configured to receive one or more write commands associated with one or more zones of the plurality of zones and generate XOR or parity data associated with the one or more zones for each of the one or more write commands in the first volatile memory unit.

The controller is further configured to copy the XOR or parity data associated with the one or more zones from the first volatile memory unit to the one or more dedicated data parking sections sequentially and copy previously generated XOR or parity data associated with the one or more zones from the one or more dedicated data parking sections to the first volatile memory unit when one or more additional write commands are received to write data to the one or more zones. The controller is also configured to update the previously generated XOR or parity data for each of the one or more additional write commands in the first volatile memory unit and copy the updated previously generated XOR or parity data for each of the one or more additional write commands to the one or more dedicated data parking sections sequentially.

The one or more dedicated data parking sections comprises SLC parking locations. The one or more dedicated data parking sections is a first zone that stores all XOR or parity data for each zone storing user data. The one or more dedicated data parking sections is a plurality of dedicated data parking sections and each dedicated data parking section is one or more SLC erase blocks within each zone.

The storage device further comprises a second volatile memory unit, wherein the first volatile memory unit is an SRAM unit, and wherein the second volatile memory unit is a DRAM unit. The controller is further configured to generate first XOR or parity data associated with a first zone while simultaneously writing second XOR or parity data associated with a second zone to the one or more dedicated data parking sections. The controller is also configured to update first data parking associated with a first zone when a first command to write data to the first zone is received, and simultaneously, write the data associated with the first command to the first zone.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
  a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
  a first volatile memory unit; and
  a controller coupled to the non-volatile storage unit and the first volatile memory unit, wherein the controller is configured to:
    receive a first write command to write data to a first zone of the plurality of zones;
    copy first XOR or parity data associated with the first zone from a first data parking section in the non-volatile storage unit to the first volatile memory unit;
    update the first XOR or parity data associated with the first zone with new XOR or parity data associated with the first write command in the first volatile memory unit; and
    copy the updated first XOR or parity data associated with the first zone from the first volatile memory unit to the first data parking section in the non-volatile storage unit.

2. The storage device of claim 1, wherein the first data parking section in the non-volatile storage unit comprises one or more erase blocks within the first zone.

3. The storage device of claim 1, wherein the controller is further configured to update a current location of the updated first XOR or parity data within the first zone in a logical block address table.

4. The storage device of claim 1, wherein the controller is further configured to copy second XOR or parity data associated with a second zone from a first erase block in the second zone to a second erase block in the second zone, wherein a second data parking section in the non-volatile storage unit comprises the first erase block and the second erase block of the second zone.

5. The storage device of claim 4, wherein the controller is further configured to erase the first erase block of the second zone upon re-writing the second XOR or parity data from the first erase block to the second erase block.

6. The storage device of claim 4, wherein the controller is further configured to update a logical block address table to indicate the second XOR or parity data is currently stored in the second erase block of the second zone.

7. The storage device of claim 4, wherein the first XOR or parity data associated with the first zone is stored in a first location of the first data parking section, and the updated first XOR or parity data is copied to a second location in the first data parking section, and wherein the first location and the second location are sequential.

8. A storage device, comprising:
  a non-volatile storage unit, wherein a capacity of the non-volatile storage unit is divided into a plurality of zones, and wherein the non-volatile storage unit comprises a plurality of dies, each of the plurality of dies comprising a plurality of erase blocks, and wherein the non-volatile storage unit comprises one or more dedicated data parking sections;
  a first volatile memory unit; and
  a controller coupled to the first volatile memory unit and the non-volatile storage unit, the controller comprising a second volatile memory unit, wherein the controller is configured to:
    receive a first write command corresponding to a first zone within a plurality of zones;
    generate XOR or parity data associated with the first zone, the XOR or parity data corresponding to the first write command;
    copy the XOR or parity data to a first location in the one or more dedicated data parking sections; and
    copy the XOR or parity data to a first location in the second volatile memory unit.

9. The storage device of claim 8, wherein the non-volatile storage unit is a NAND memory unit, wherein the first volatile memory unit is a SRAM unit, and wherein the second volatile memory unit is a DRAM unit.

10. The storage device of claim 8, wherein the one or more dedicated data parking sections is a plurality of dedicated data parking sections, and wherein each dedicated data parking section is a single-level cell (SLC) die within each zone.

11. The storage device of claim 8, wherein the one or more dedicated data parking sections is one dedicated data parking section, and wherein the one dedicated data parking section is a first zone that stores all XOR or parity data for each zone storing user data.

12. The storage device of claim 8, wherein the controller comprises an XOR engine, the XOR engine being configured to generate and update XOR or parity data for the controller.

13. The storage device of claim 8, wherein the controller is further configured to: simultaneously write second XOR or parity data associated with a second zone sequentially to a second location of the one or more dedicated data parking sections and write the second XOR or parity data associated with the second zone sequentially or randomly to a second location in the second volatile memory unit.

14. A storage device, comprising:
  a non-volatile storage unit, wherein a capacity of the non-volatile storage unit is divided into a plurality of zones, wherein the non-volatile storage unit comprises a plurality of dies, each of the plurality of dies comprising a plurality of erase blocks, and wherein the non-volatile storage unit comprises one or more dedicated data parking sections;

a first volatile memory unit; and a controller coupled to the non-volatile storage unit and the first volatile memory unit, wherein the controller is configured to:

receive one or more write commands associated with one or more zones of the plurality of zones;

generate XOR or parity data associated with the one or more zones for each of the one or more write commands in the first volatile memory unit;

copy the XOR or parity data associated with the one or more zones from the first volatile memory unit to the one or more dedicated data parking sections sequentially;

copy previously generated XOR or parity data associated with the one or more zones from the one or more dedicated data parking sections to the first volatile memory unit when one or more additional write commands are received to write data to the one or more zones;

update the previously generated XOR or parity data for each of the one or more additional write commands in the first volatile memory unit; and copy the updated previously generated XOR or parity data for each of the one or more additional write commands to the one or more dedicated data parking sections sequentially.

15. The storage device of claim 14, wherein the one or more dedicated data parking sections comprises single-level cell (SLC) parking locations.

16. The storage device of claim 14, wherein the one or more dedicated data parking sections is a first zone that stores all XOR or parity data for each zone storing user data.

17. The storage device of claim 14, wherein the one or more dedicated data parking sections is a plurality of dedicated data parking sections, and wherein each dedicated data parking section is one or more SLC erase blocks within each zone.

18. The storage device of claim 14, further comprising a second volatile memory unit, wherein the first volatile memory unit is an SRAM unit, and wherein the second volatile memory unit is a DRAM unit.

19. The storage device of claim 14, wherein the controller is further configured to generate first XOR or parity data associated with a first zone while simultaneously writing second XOR or parity data associated with a second zone to the one or more dedicated data parking sections.

20. The storage device of claim 14, wherein the controller is further configured to update first XOR or parity data associated with a first zone when a first command to write data to the first zone is received, and simultaneously, write the data associated with the first command to the first zone.

* * * * *